Dec. 10, 1963 K. J. KALLENBERG 3,113,498
PHOTOGRAPHIC PRINTER MACHINE
Filed March 10, 1959 12 Sheets-Sheet 1

INVENTOR
KARL J. KALLENBERG
BY
ATTORNEY

Dec. 10, 1963   K. J. KALLENBERG   3,113,498
PHOTOGRAPHIC PRINTER MACHINE
Filed March 10, 1959   12 Sheets-Sheet 2

INVENTOR
KARL J. KALLENBERG
BY
*Jack W. Wicks*
ATTORNEY

INVENTOR
*KARL J. KALLENBERG*
BY
*Jack N. Hicks*
ATTORNEY

Dec. 10, 1963 K. J. KALLENBERG 3,113,498
PHOTOGRAPHIC PRINTER MACHINE
Filed March 10, 1959 12 Sheets-Sheet 5
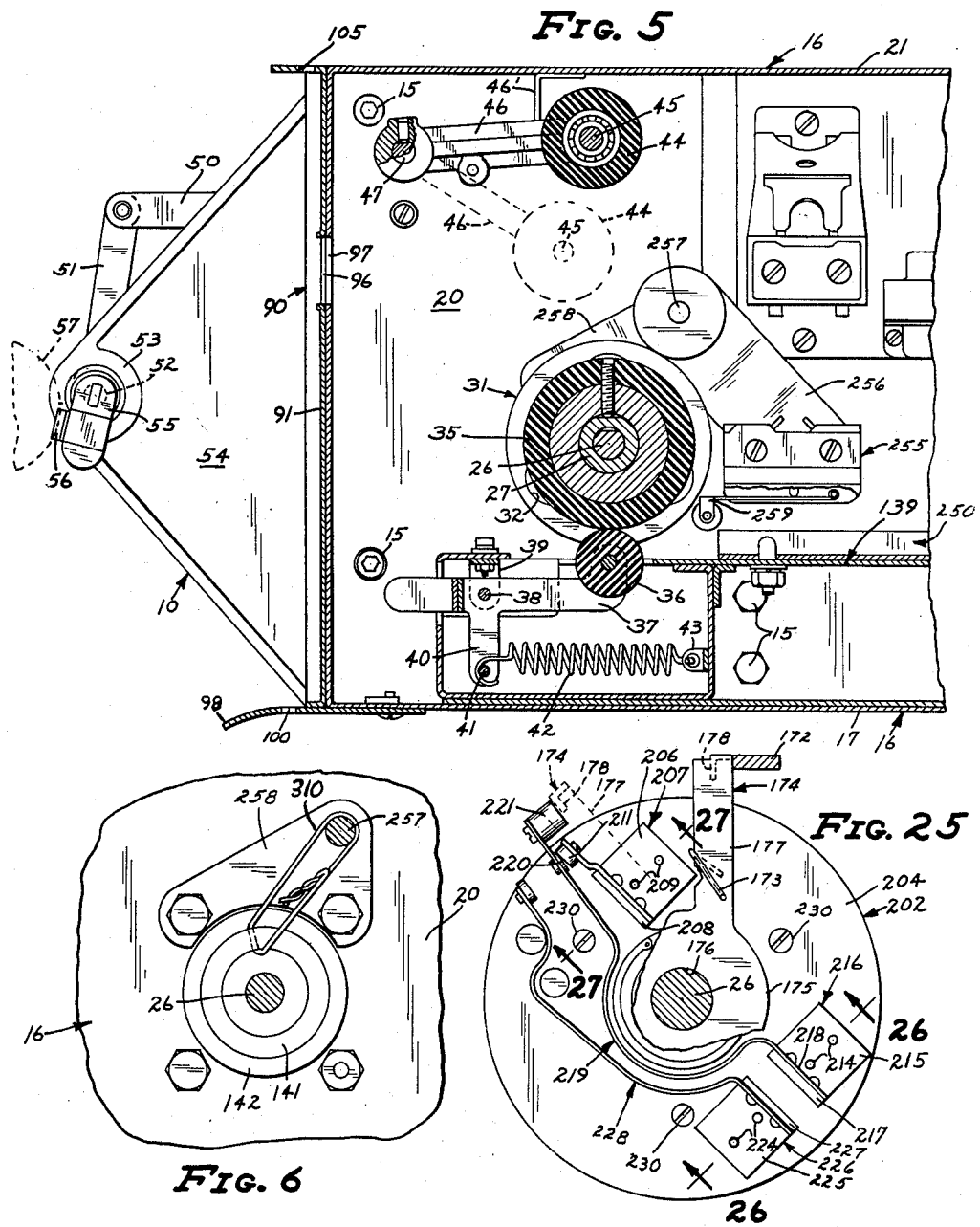
INVENTOR
KARL J. KALLENBERG
BY
Jack H. Wicks
ATTORNEY Dec. 10, 1963 K. J. KALLENBERG 3,113,498
PHOTOGRAPHIC PRINTER MACHINE
Filed March 10, 1959 12 Sheets-Sheet 6

INVENTOR
KARL J. KALLENBERG
BY Jack W. Wicks
ATTORNEY

Dec. 10, 1963 — K. J. KALLENBERG — 3,113,498
PHOTOGRAPHIC PRINTER MACHINE
Filed March 10, 1959 — 12 Sheets-Sheet 7

INVENTOR
KARL J. KALLENBERG
BY Jack W. Wicks
ATTORNEY

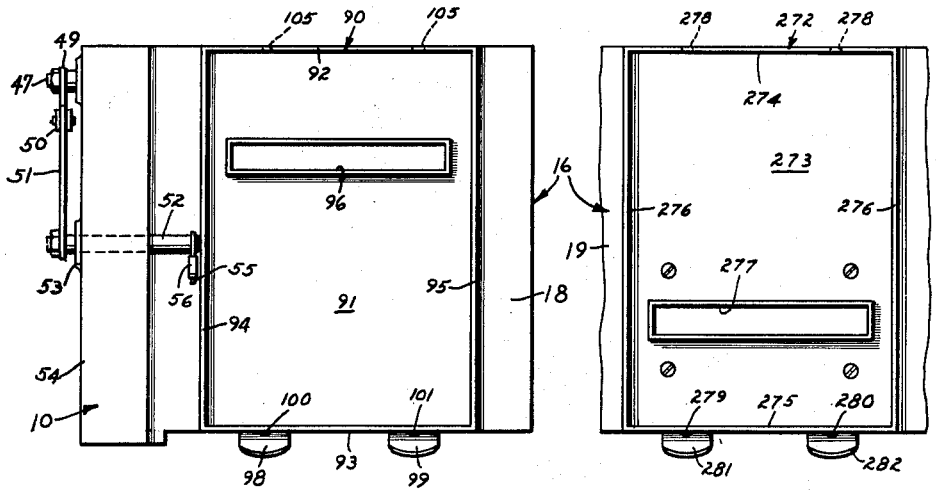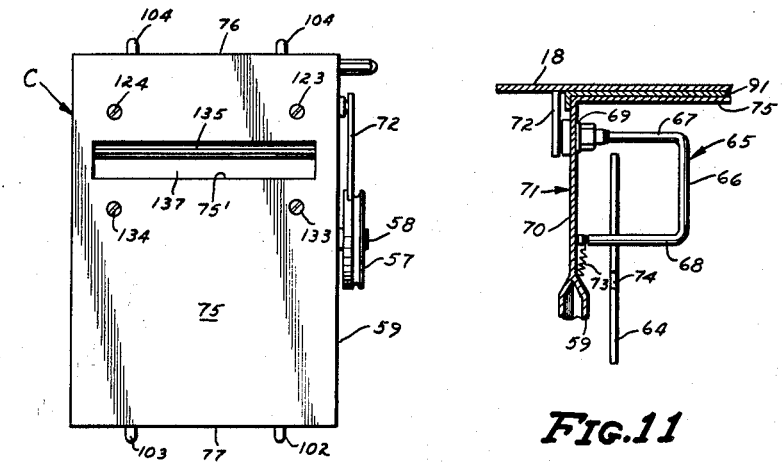

Dec. 10, 1963 K. J. KALLENBERG 3,113,498
PHOTOGRAPHIC PRINTER MACHINE
Filed March 10, 1959 12 Sheets-Sheet 9

INVENTOR.
KARL J. KALLENBERG
BY
*Jack H. Hicks*
ATTORNEY

Dec. 10, 1963 K. J. KALLENBERG 3,113,498
PHOTOGRAPHIC PRINTER MACHINE
Filed March 10, 1959 12 Sheets-Sheet 10

INVENTOR
KARL J. KALLENBERG
BY
Jack N. Hicks
ATTORNEY

Dec. 10, 1963 K. J. KALLENBERG 3,113,498
PHOTOGRAPHIC PRINTER MACHINE
Filed March 10, 1959 12 Sheets-Sheet 11
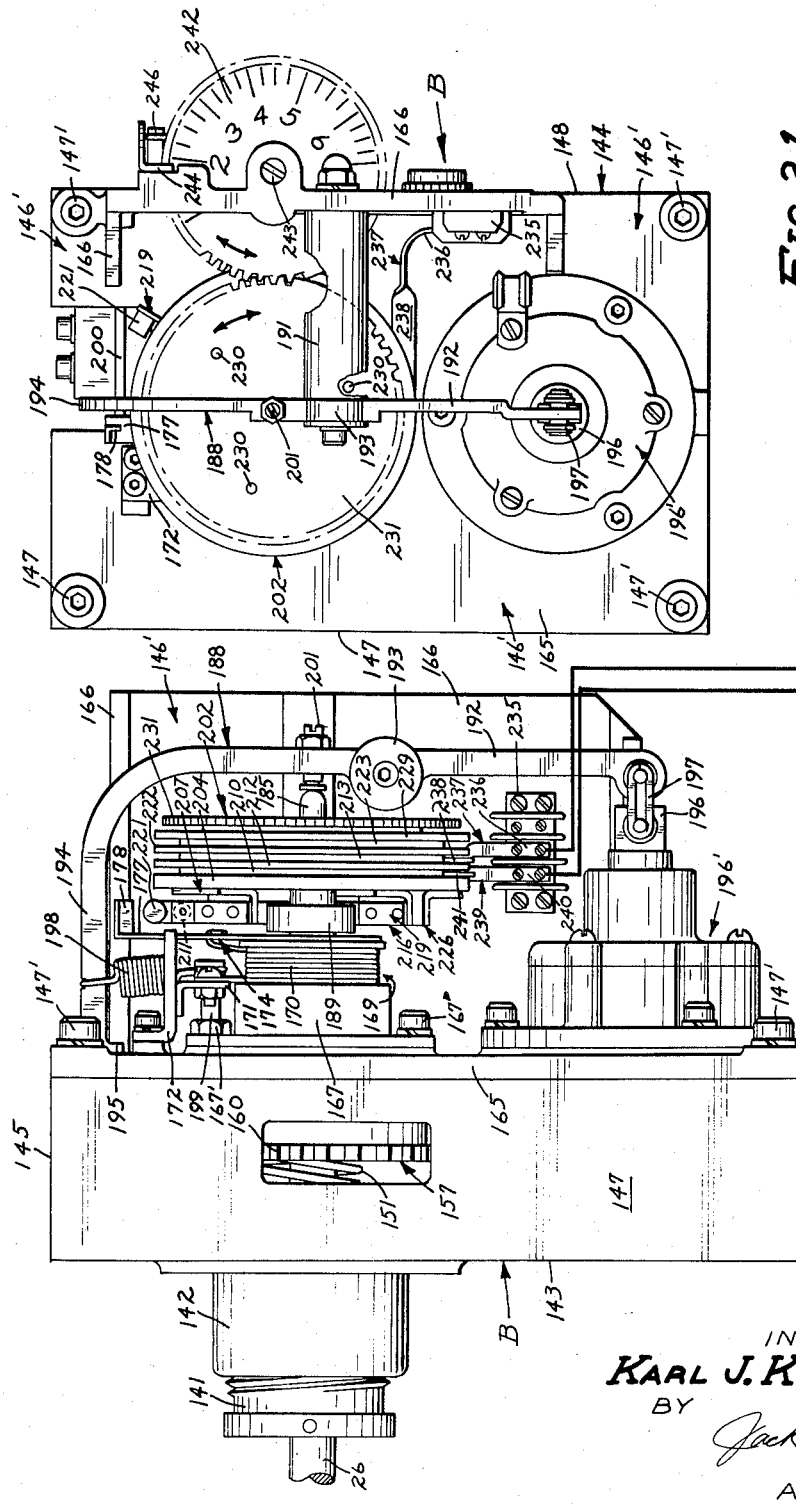
INVENTOR
KARL J. KALLENBERG
BY
Jack N. Nicks
ATTORNEY Dec. 10, 1963  K. J. KALLENBERG  3,113,498
PHOTOGRAPHIC PRINTER MACHINE
Filed March 10, 1959  12 Sheets-Sheet 12

INVENTOR
KARL J. KALLENBERG
BY
Jack N. Hicks
ATTORNEY

United States Patent Office 3,113,498
Patented Dec. 10, 1963

3,113,498
PHOTOGRAPHIC PRINTER MACHINE
Karl J. Kallenberg, Minneapolis, Minn., assignor to Pako Corporation, Minneapolis, Minn.
Filed Mar. 10, 1959, Ser. No. 798,503
2 Claims. (Cl. 95—34)

My invention relates generally to an improvement in the field of photography and more particularly to a device for automatically making successive exposures of a photographic negative or negatives on sensitized print paper. In commercial photography it is almost universally necessary to make a single print from each of a series of different negatives or a number of prints from a single negative and there is a pressing demand for a machine capable of making a larger number of prints of uniform fine quality in rapid succession.

It is an object of my invention to provide a photographic printer machine including means for automatically transporting or advancing a strip of sensitized paper to a fixed exposure point where the paper is stopped for exposure and then advanced and stopped for selective successive intermittent exposures on the paper from a single negative or different negatives.

It is a further object to provide a photographic printer machine having new and novel means for intermittently driving said paper transporting means actuated by an electrical signal or impulse delivered from electrical control means forming subject matter of an application for Photographic Printer Serial No. 790,226, filed January 30, 1959.

It is an additional object to provide a photographic printer machine having means for drawing the sensitized strip paper off a supply roll in a short length prior to advancement of the paper so that the mass of the supply roll does not have to be overcome directly upon advancement of the paper strip.

It is also an object to provide a photographic printer machine having removable magazine means for interchangeable use with the paper supply roll or the paper take-up roll means, the magazine means having light excluding means whereby the magazine may be removed from the unit for handling or further processing the exposed paper therein.

It is still another object to provide means for prohibiting movement of the roll of paper within the magazine means when the magazine is removed from the unit.

It is further object to provide means for braking the supply roll of paper at the time when paper is not being drawn off the same.

Means for regulating exposure and focusing the negative upon the paper are included in other applications.

A further object of my invention is to provide a photographic printer machine having a casing in which the paper is exposed to the negative, the casing being formed with light excluding means which in conjunction with the paper supply and take-up magazines having light excluding means allows my printer machine to process color negatives in daylight.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:
FIGURE 1 is a front elevational view of my photographic printer machine.

FIGURE 5 is a detailed sectional view on the line 5—5 of FIGURE 3, some parts removed.

FIGURE 6 is a fragmentary view of a bracket mounting the drive unit and warning switch.

FIGURE 11 is a top plan view of the lock member for the paper spool only a portion of the casing and paper magazine being shown, some parts being in section and some parts removed.

FIGURE 12 is an end elevational view of the casing with the supply magazine removed, some parts being removed.

FIGURE 13 is an end elevational view of the end of the supply magazine which is positioned against the end of the casing.

FIGURE 20 is a side elevational view of the drive unit opposite to that shown in FIGURE 18 with the shaft driven thereby.

FIGURE 21 is a rear elevational view of the drive unit.

FIGURE 25 is a view on the line 25—25 of FIGURE 19 of a portion of the drive some parts in section and some parts broken away.

FIGURE 28 is a fragmentary vertical sectional view on the line 28—28 of FIGURE 2 some parts in section.

FIGURE 30 is an end elevational view of the casing, the paper take-up magazine removed and some parts removed and others broken away.

FIGURE 31 is a fragmentary sectional view substantially on the line 31—31 of FIGURE 3, some parts removed.

FIGURE 32 is a perspective view of the adjustable removable paper guide flange of the paper drive shaft.

Figure 1:
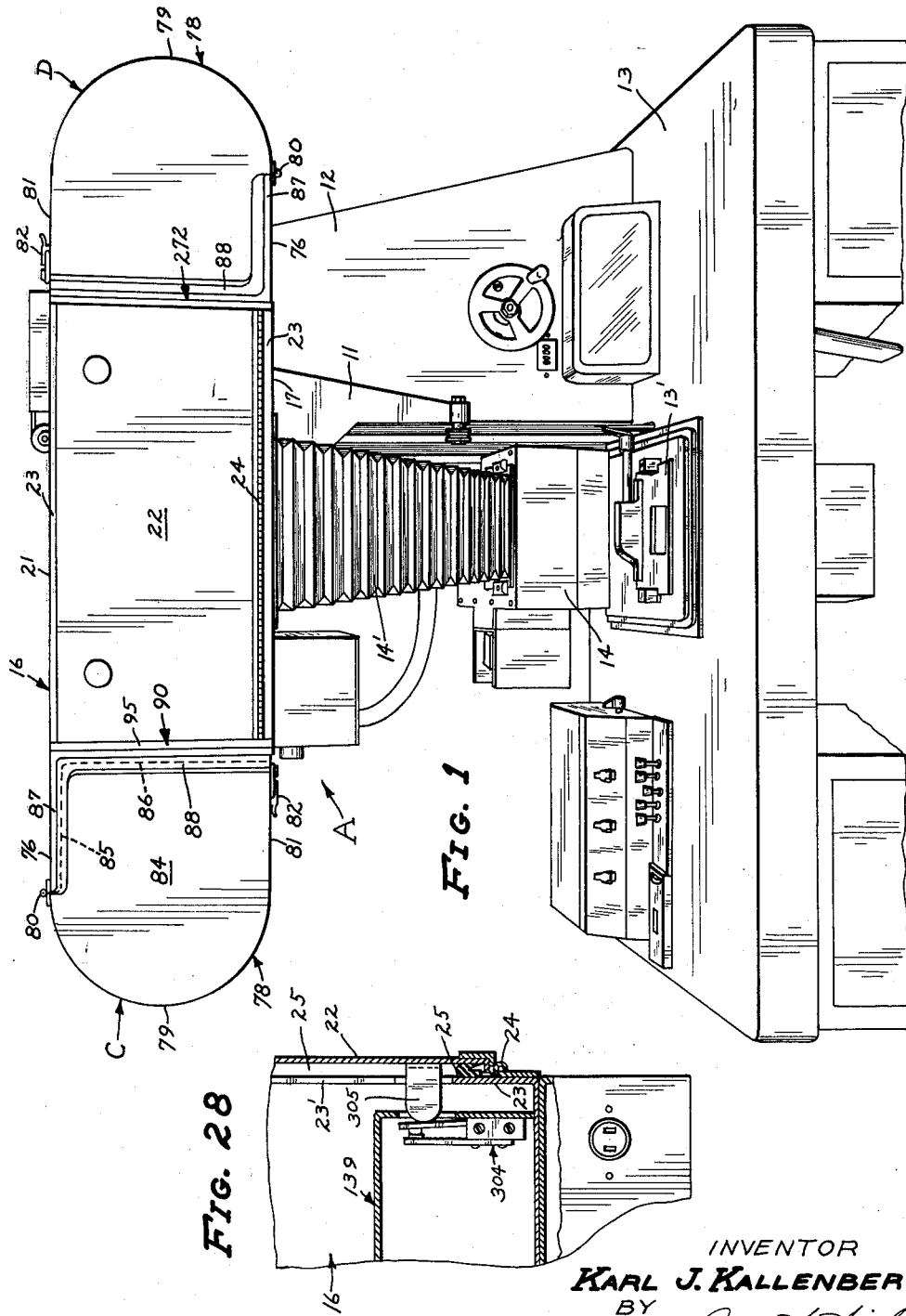

Referring to the drawings in detail, my photographic printer machine A includes in this application the substantially rectangular vertically disposed back support wall casting 10 which is secured to the upper end of the vertical support 11, FIGURE 1. The vertical support 11 is vertically movable on the column 12 mounted on the base 13. The column 12 also slidably mounts the lens deck housing 14 which houses the analyser unit, lens and shutter arrangement not shown here. The details of the support 11, the column 12, the lens deck housing 14 and the movement thereof relative to the base 13 are set forth in other applications on file, the construction of which is not necessary here.

Figure 4:
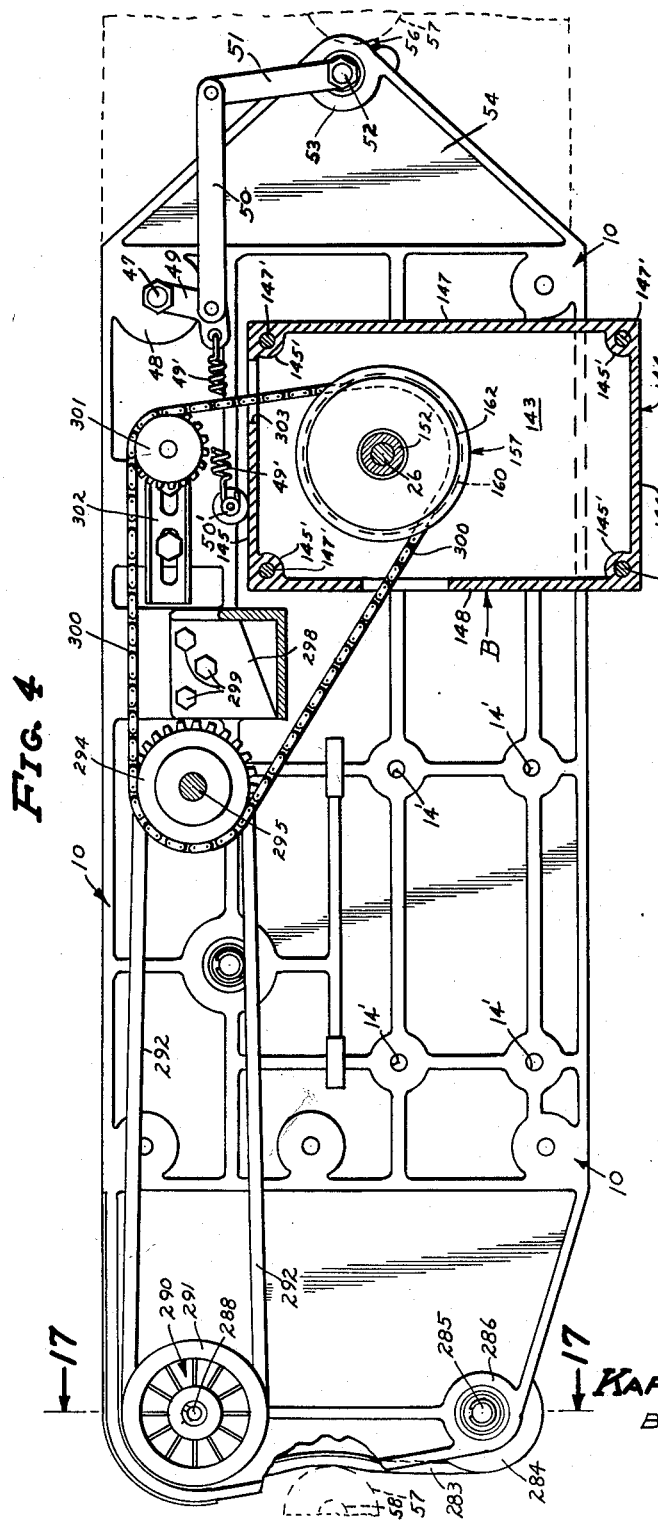
FIGURE 4 is a longitudinal rear view on the line 4—4 of FIGURE 3 some parts in section and other parts removed.

The support wall 10 is secured to the vertical support 11 by means of bolts extending through the spaced holes 14', FIGURE 4, and threadedly engaging a portion of the support 11 not shown. Secured to the wall support 10 by means of a series of bolts such as 15 is the casing 16. The casing 16 and its component parts together with the paper supply and take-up magazine hereinafter described is generally referred to as the "paper deck" with which we are primarily concerned here. The casing 16 includes the bottom 17, the end wall 18, the end wall 19, the back wall 20 mounted up against the support wall 10 and secured thereto as above. The casing 16 also includes the top 21 and the front door portion 22 hingedly connected at its lower edge to the narrow front wall 23 at its lower edge by means of the hinge 24. The narrow front wall 23 borders the bottom 17, the end walls 18 and 19 and the top 21 thereby providing a large opening 23' for access into the casing from the front. The front door 22 makes a light exclusion seal with the narrow peripheral front wall 23 by means of the gasket 25 mounted on the inner periphery of the front wall 23 which contacts the inner flat surface of the door 22 when the same is closed.

Rotatably mounted on the back support wall 10 and extending inwardly into the casing 16 is the drive shaft 26 which is driven by the drive assembly B hereinafter described. The shaft 26 has mounted thereon the sleeve or flange support 27, and formed in the sleeve are a series of opposed slots 28 the inner bottom surfaces of which are parallely disposed. The slots 28 receive the parallely disposed and spaced edges 29 and 30 of the flat circular flanges 31. A flange 31 is further formed with the circular opening 32 into which the slot 29' formed by the edges 29 and 30 enters, and the diameter of the opening 32 is slightly greater than the diameter of the sleeve 27. Further provided on the flange 31 are the arcuate spring arms 33 and 34 held by the rivet 33'. There are two flanges 31 provided which are spaced on the sleeve 27 by means of the slots 28 a distance slightly greater than the width of the print paper being run through the casing for exposure. A flange 31 is positioned in any of the opposed slots 28 by slipping the sleeve 27 into the opening 32 and then sliding the edges 29 and 30 into engagement with the slots 28. As this is done the spring arms 33 and 34 engage the sleeve 27 thereby securely but removably positioning the flanges 31 on the sleeve 27 of the shaft 26.

The numeral 35 designates a rubber paper feed roller which is mounted substantially centrally on the shaft 26. Further provided is the rubber pressure guide roller 36 positioned below the feed roller 35 and rotatably mounted on a pair of arms 37, FIGURES 2 and 5, which are pivotally mounted on the pin 38 secured to the bracket 39. Depending from each of the arms 37 is a short arm 40 and connecting the lower ends of the short arms 40 is the pin 41. A coil spring 42 is connected to the pin 41 and the upstanding bracket 43 thereby urging the pressure roller 36 upwardly against the feed roller 35 whereby strip print paper designated as X may be fed by the roller 35 as hereinafter described.

The numeral 44 designates a paper advance roller, FIGURES 2, 3, 4, 5 and 7 which is freely rotatable on the shaft 45 mounted on the outer end of the arm 46. The inner end of the arm 46 is connected to a short shaft 47 which is journaled in the enlarged portion 48 of the back support casting 10 and extends outwardly therefrom. The upward and fully retracted movement of the arm 46 is limited by the stop shoulder 46' secured to the casing. The outer end of the shaft 47 has connected thereto the short substantially L-shaped arm 49, and pivotally connected at its inner end to the short arm 49 is the substantially horizontal intermediate arm 50. Pivotally connected to the outer end of the arm 50 is the outer end of the outer arm 51. The inner or lower end of the arm 51 is fixedly secured to the outer end of the brake shaft 52 which is rotatably mounted in the enlarged portion 53 of the extended end portion 54 of the back support wall casting 10. Secured to the inner end of the brake shaft 52 is the short brake shoe arm 55 and mounted on said arm 55 is the brake shoe or foot member 56 which is engageable with the outer edge of the pulley 57 mounted on the rear side wall of the magazine C, mounted on one end of the casing 16 and housing the supply roll of print paper. The arms 49 and 50 are urged towards the center of the casing 16 by means of the coil spring 49' secured to the lower end of the arm 49 and the spring mount 50', the arm 49 pivotally connected to the arm 50 as hereinbefore set forth. With the arms 49 and 50 so urged the paper advance roller 44 is held in a raised position as in FIGURE 2 and the brake shoe 56 is against the pulley 57 braking the same. A second magazine D is mounted on the opposite end of the casing 16 wherein the exposed print paper is taken up, and it is to be noted that both magazines are identical and interchangeable as will be pointed out more particularly hereinafter. The pulley 57 is mounted on the outer end of the shaft 58 rotatably mounted on the double wall 59 portion of the magazine C by means of the bearings 60 and 61 mounted in the housing 62, particularly in FIGURE 10. A print paper supply spool 63 is secured to the shaft 58, and secured to the inner end of the spool 63 and concentrically therewith is the circular spool lock 64, FIGURES 7 and 10, and shown in broken line in FIGURE 9.

I provide means for locking the circular spool lock 64 in a non-rotative position automatically within the magazine when the magazine C is removed from the casing 16 and thereby prohibit the spool 63 from rotating. This is also true with regard to the magazine D. As a result print paper wound on the spool 63 will not be unwound from the spool. The locking means for the spool 63 includes a U-shaped lock member 65, FIGURES 7, 8 and 11 particularly, formed of the base portion 66 and the spaced leg portions 67 and 68 extending therefrom. The leg portion 67 of the lock is pivotally mounted in the bearing member 69 connected to the wall portion 70 of the magazine C, the wall portion 70 being connected to the double wall portion 59, the two wall portions 70 and 59 making up the rear stationary side wall 71 of the magazine C.

The outer free end of the leg portion 67 has connected thereto the arm 72 which lies along side the stationary wall 71 of the magazine C. Also provided is the coil spring 73 which is connected at one end to the outer free end of the leg portion 68 of the lock member 65, the other end of the spring 73 being connected to the side wall 71 of the magazine. With the spring so connected the same urges the leg portion 68 downwardly, but with the arm 72 bearing against the end wall 18 of the casing 16 when the magazine is in the attached position shown in FIGURE 1, the arm 68 of the lock 65 cannot move downwardly to the edge of the circular spool lock beyond the position shown in FIGURES 2 and 7. The circular disc lock member 64 has formed on the edge thereof the notches 74. When the magazine C is lifted slightly for removal from the casing 16, as hereinafter set forth in detail, the arm 72, moves to the position shown in FIGURE 8 by means of the spring 73 for the resistance in the form of the wall 18 has been removed. As a further result, the leg portion 68 is pulled downwardly and contacts the outer edge of the disc lock 64 and into one of the notches 74 formed in the edge thereof, FIGURES 8 and 9. Due to the spring 73 the leg portion 68 of the lock member 65 is maintained in one of the notches 74, and as a result the spool 63 will not rotate within the magazine C and allow the paper thereon to become unrolled.

When the magazine C is attached to the casing 16, in the detailed manner hereinafter set forth, the arm 72 is pivoted and forced against the wall 18 of the casing and in pivoting the leg portion 68 of the lock member 65 is lifted out of the notch 74 of the disc 64 thereby removing the locking means from the spool allowing the disc 64 and spool 63 connected thereto to rotate when the brake 56 is removed.

The magazine C includes the stationary rear side wall 71 to which is connected the inner end wall 75. The end wall 75 is formed with the paper aperture 75'. Also magazine C includes the partial top wall 76, the partial bottom wall 77, and the hingedly mounted movable cover member 78. The cover member 78 includes the arcuate end portion 79 the upper edge of which when viewing the same in closed position, is hinged to the outer edge of the partial top wall 76 by means of the hinge 80. The lower end of the arcuate end portion terminates in the flat portion 81 on which is mounted the fastener portion 82. The cover further includes the partial arcuate side wall portion 83 connected to the edge of the arcuate end portion 79 and secured to the opposite edge is the wall portion 84 formed with the top edge 85 and the vertical edge 86 when viewed in closed position, FIGURE 1. The edge portion 85 positions neatly behind the partial top wall portion 87 when the cover 78 is closed, as in FIGURE 1, and the edge portion 86 positions behind the partial vertical wall 88 of the magazine C. The wall portion 88 joins the wall portion 87 with the former depending from the partial top wall 76 and the latter extending outwardly from the inner wall 89 of the magazine C, the inner end wall 75 being removably mounted adjacent the end 18 of the casing 16 when the magazine is in operative position.

Secured to the end wall 18 of the casing 16 is the magazine receiver plate 90, FIGURES 5 and 12 in particular, which is formed of the flat base plate portion 91, and a peripheral plate wall including the upper wall 92, the lower wall 93, the side wall 94 and the opposed side wall 95. The base portion 91 has the paper receiving aperture 96 formed therein which is in alignment with a similar aperture 97 formed in the end wall 18.

The numerals 98 and 99 designate a pair of identical spring tongues secured to the underside 17 of the casing 16 in spaced relation and extending outwardly of the plate 90 and each has formed therein the holes 100 and 101 respectively, which receive the short pins 102 and 103 mounted on the underside of the partial bottom wall 77 to aid in locking the magazine C on the receiver plate 90 against the wall 18 of the casing 16.

Figure 8:
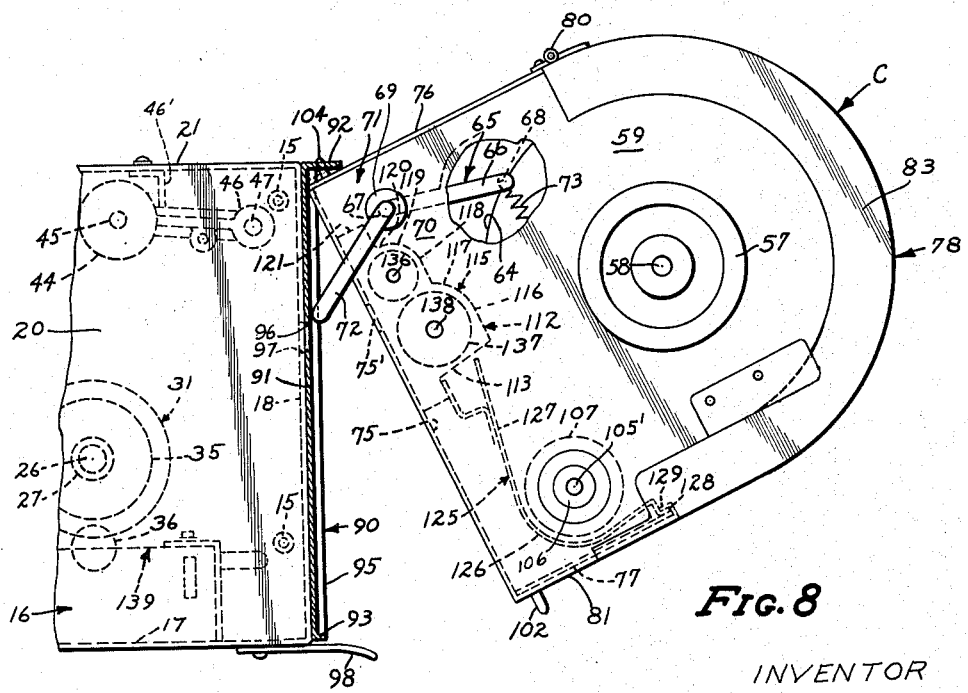
FIGURE 8 is a rear side view of the magazine shown in FIGURE 7 with the magazine partially open to illustrate the means for locking the supply roll within the magazine.

The magazine C is initially attached to the casing by a pair of spaced pins 104 extending upwardly from the partial top wall 76 which are first positioned in the spaced holes 105 formed in the upper wall 92 of the magazine receiver plate 90 by holding the magazine C substantially at the angle illustrated in FIGURE 8. The magazine is then brought against the casing to engage the pins 102 and 103 with the spring tongues 98 and 99 which direct the pins into the holes 100 and 101 respectively thereof.

As a result the magazine is securely and removably locked to casing 16, with the cover 78 in an open or closed position. With the magazine C attached to the end of the casing 16, the aperture 75' of the magazine wall 75 is in alignment with the aperture 96 of the receiver plate 90 and the aperture 97 of the casing end wall 18 for receiving the strip print paper hereinafter referred to.

The magazine C also includes the idler shaft 105' the rear end of which is rotatably mounted on the wall portion 70 of the stationary rear side wall 71 by means of the pair of bearings 106. Further provided are a pair of spaced paper guide rollers 107 and 108 adjustably mounted on the shaft 105'. The rollers 107 and 108 are each formed with the annular paper supporting hub 109 and the annular shoulder 110. The space between the paper guide rollers 107 and 108 is determined by the width of the printing paper used on the spool 63. The numeral 111 designates a disc secured on the shaft 105 substantially centrally of the guide rollers 107 and 108, the purpose of which is to aid in supporting the print paper.

I further provide within the magazine C the light lock housing 112 which includes the substantially horizontal bottom portion 113 which has the elongated paper aperture 114 formed therein. The housing 112 further includes the outer front wall 115 having an upright flat portion 116 terminating in an arcuate portion 117 which terminates in a further flat upright portion 118 terminating in a second arcuate portion 119 which terminates in the horizontal top portion 120. Extending from the top portion 120 of the housing 112 is the pair of lugs 121 and 122 which receive the mounting screws 123 and 124 extending from the wall 75 to thereby support the housing 112 on the wall 75.

Figures 9, 10:
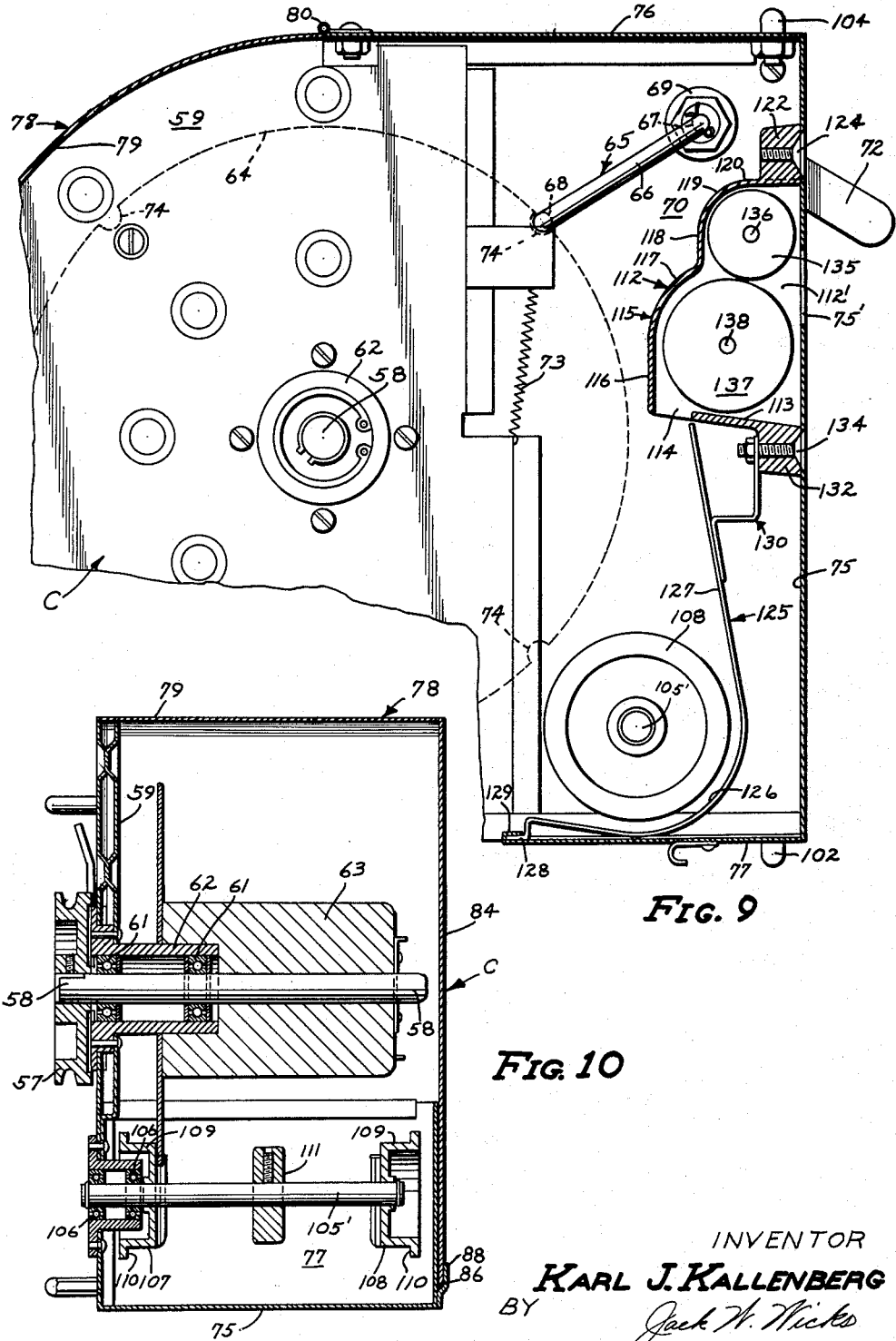
FIGURE 9 is a vertical section through the paper supply roll magazine with some parts broken away and some parts removed.
FIGURE 10 is a sectional view on the line 10—10 of FIGURE 7.
Figure 14:
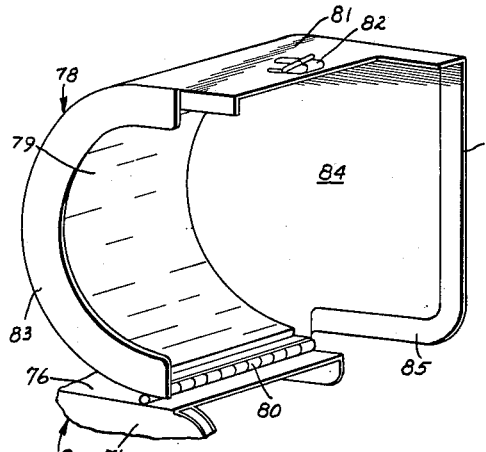
FIGURE 14 is a perspective view of the magazine cover in open raised position.
Figure 16:
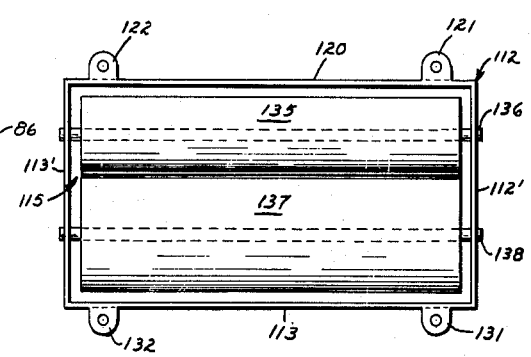
FIGURE 16 is a front elevational view of the light lock of the paper supply and take-up magazines.
Figure 29:
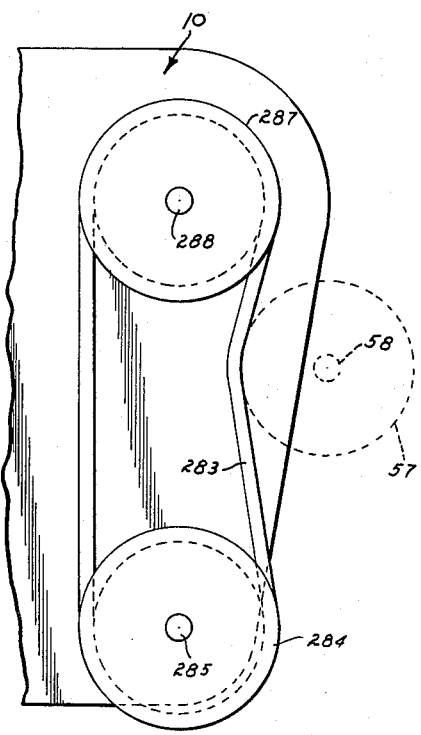
FIGURE 29 is a fragmentary elevational view on the line 29—29 of FIGURE 17 with the driven pulley of the take-up roll shown in broken lines.
Figure 15:
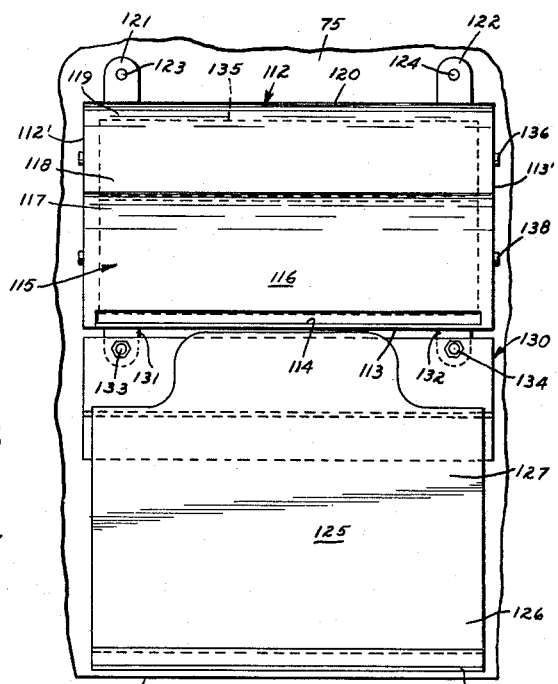
FIGURE 15 is a view substantially on the line 15—15 of FIGURE 2 with the supply spool lock arm and paper guide rollers removed, the end wall of the casing only partially shown.
Figure 18:
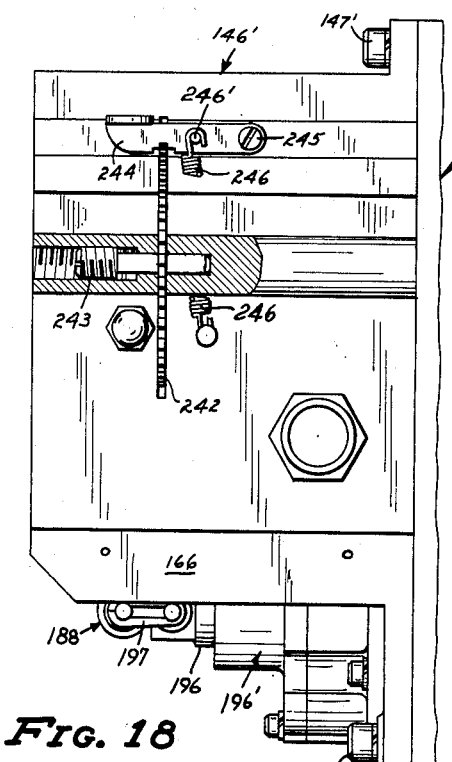
FIGURE 18 is a side elevational view of the drive unit from the left looking at the front of the printer, some parts broken away.
Figure 17:
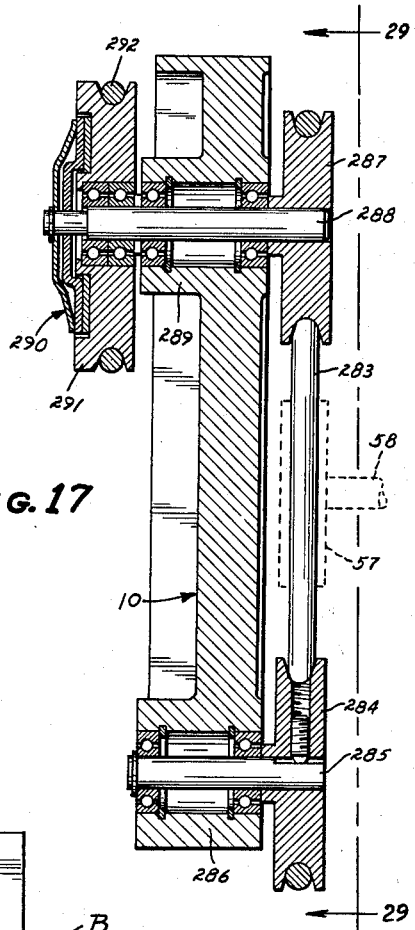
FIGURE 17 is a sectional view on the line 17—17 of FIGURE 4 showing the slip clutch and drive means for the paper take-up roll.
Figure 19:
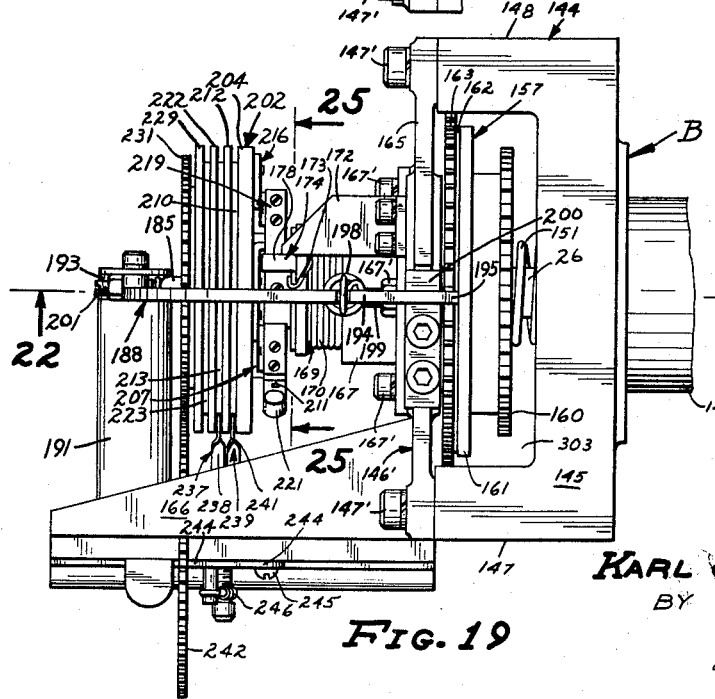
FIGURE 19 is a top plan view of the drive unit.
Figures 22, 23, 24:
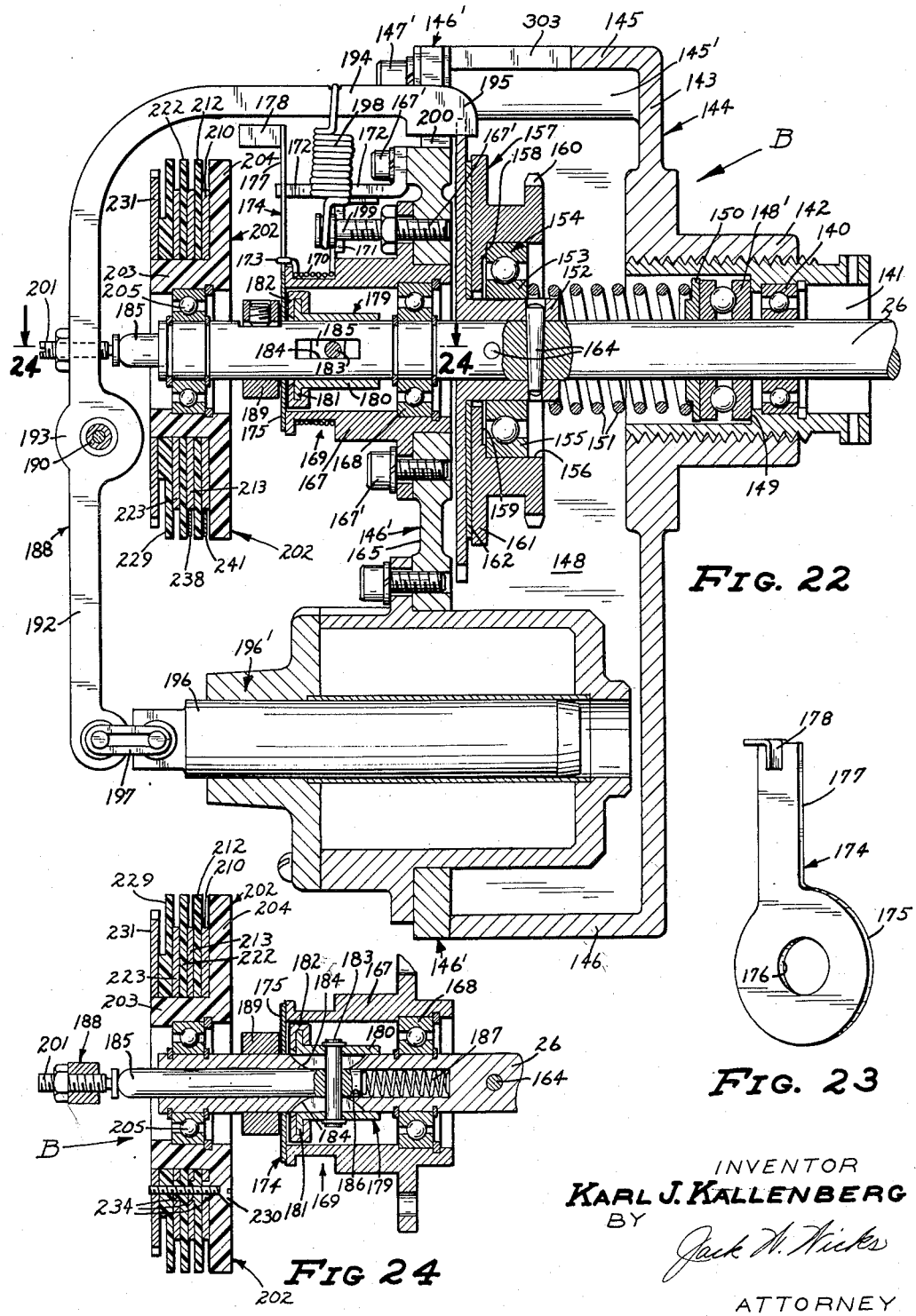
FIGURE 22 is a vertical section of the drive unit on the line 22—22 of FIGURE 19.
FIGURE 23 is a perspective view of the drive unit switch breaker arm.
FIGURE 24 is a longitudinal section on the line 24—24 of FIGURE 22, some parts removed.

Further provided within the magazine C is the paper guide 125, particularly FIGURES 9 and 15, positioned below the light lock 112 which is formed of the arcuate base portion 126 terminating in the upwardly and angularly extending flat portion 127, the upper edge of the portion 127 being positioned adjacent the aperture 114 of the housing 112. The base portion 126 is formed with the lip portion 128 which is secured under the lip 129 formed on the outer edge of the bottom wall 77. The upstanding flat portion 127 of the guide 125 is further supported by the bracket 130 secured thereto and to lugs 131 and 132 formed on the lower edge of the housing 112 by means of the bolts 133 and 134 extending through the lugs 131 and 132 from the wall 75 thereby further supporting the housing 112 in conjunction with the screws 123 and 124.

I further provide within the light lock housing 112 the upper roller 135 rotatably mounted on the shaft 136 secured to the ends 112' and 113' of the housing 112. Also provided is the lower roller 137 rotatably mounted on the shaft 138 which is below and slightly offset from the shaft 136 and the upper periphery of the lower roller 137 is substantially in line with or slightly higher than the lower periphery of the upper roller 135. The inside of the housing 112 is blackened and this together with the roller provides a light lock for the magazine C. The continuous strip print paper indicated as X and mounted on the spool 63 is pulled off the spool, passed under the guide rollers 107 and 108, extended upwardly in front of the guide 125 and upwardly through the aperture 114 of the light lock 112, thence between the rollers 135 and 137, and out through the aperture 75'. The paper X may then be fed from the magazine through the apertures 96 and 97 of the plate 90 and the casing end wall 18 respectively and into the casing 16 where the paper is positioned on the paper advance roller 44 and thence downwardly to and under the feed roller 35 where it is directed to the table member generally designated as 139 which is mounted on the bottom 17 of the casing 16.

*Paper Feed Drive Assembly*

The drive shaft 26 is intermittently rotated by the paper feed drive assembly generally designated as B, FIGURES 18–24. The shaft 26 is rotatably mounted at one point in the bearing 140 secured within the adjustable outboard bearing support 141 which is threadedly engaged with the hub 142 formed as part of the inner wall 143 of the housing 144, thereby making it adjustable. The housing 144 also includes the upper wall 145, the lower wall 146 and end walls 147 and 148. The housing 144 is formed with the four bosses 145' which mount the chassis 146' by means of the bolts 147'. Further provided in the thrust bearing 148' slidably mounted on the shaft 26 inwardly of the bearing 140 and against the shoulder 149 formed internally of the bearing support 141. Slidably positioned on the shaft 26 and against the bearing 148' is the stepped washer 150 against which the inner end of the spring 151 is positioned on the hub 152 and bears against the inner race 153 of the bearing 154, the inner race 153 having a sliding fit upon the hub 152. The outer race 155 of the bearing 154 is press fit within the annular recess 156 formed within the pressure disc 157, the recess 156 formed within the shoulder 158 which allows the outer race 155 to rotate independently of the inner race 153 due to the fact that the shoulder 158 is relieved at 159. The pressure disc 157 further includes the sprocket portion 160 spaced from the plate portion 161 and formed integral therewith. The sprocket 160 is driven by a chain drive hereinafter described. The numeral 162 designates a lubricated felt washer freely rotatable on the hub 152, the washer 162 being positioned between the plate portion 161 and the ratchet 163 formed as part of the hub 152. The hub 152 is keyed to the shaft 26 by means of the pair of keys 164.

The chassis 146' includes the flat plate portion 165 and the support portion 166 extending at a right angle therefrom. The plate portion 165 mounts the cylindrical main bearing housing 167. The housing 167 is secured to the plate 165 by means of the bolts 167'. Positioned within the housing 167 is the main bearing 168 which, in conjunction with the bearing 140, rotatably supports the shaft 26. Formed on the outer end of the housing 167 is the annular recess 169 in which is positioned the weak coiled return spring 170, one end of which is connected to the bracket 171 connected to the return stop 172 for the arm 174, the other end having a hook portion 173 connected to the switch breaker arm 174. The arm 174 includes the circular base portion 175 having the concentric hole 176 through which the shaft 26 extends. The base 175 is freely rotatable on the shaft 26 and extending radially from the base 175 is the arm 177 on the outer end of which is formed the shoulder 178.

Further provided is the cylindrical pressure slide 179 formed of the sleeve portion 180 and the annular shoulder 181 on which is molded the annular friction ring 182. The slide 179 is slidably mounted on the shaft 26 by means of the pin 183 connected thereto and extending through the slot 184 formed in the shaft 26. The pin 183 also extends through the slide actuating rod 185 which is slidably mounted in the shaft 26 within the bore 186 formed therein. The rod 185 together with the slide 179 pinned thereto is urged outwardly of the shaft 26 by means of the coil spring 187 positioned within the bore 186 and abutting the inner end of the rod 185. When the shaft 26 is restrained from rotating, the friction ring 182 is maintained out of contact with the base 175 of the arm 174 by being held within the confines of the housing 167 through the action of the latch arm 188 bearing against the outer end of the rod 185, the latch arm hereinafter described.

A collar 189 is secured to the shaft 26 and spaced slightly from the base 175 of the arm 174 to act as a stop for the base 175 whereby the friction ring 182 can engage the base 175 and thereby in effect connecting the arm 174 to the shaft 26 whereby the arm 174 is caused to rotate with the shaft 26.

The aforementioned latch arm 188 is pivotally journaled on the shaft 190 which is mounted on the spaced arm 191 secured to and extending from the support 166. The latch arm 188 is formed of the leg base portion 192 having the enlarged portion 193 in which the shaft 190 is positioned and the right angular leg portion 194 which has formed on the outer end thereof the latch head portion 195. The lower end of the latch arm 188 is connected to the outer end of the solenoid armature 196 of the solenoid 196' by means of the chain link 197. The leg portion 194 of the arm 188 is urged downwardly by means of the spring 198 connected thereto and the anchor screw 199, however the extent of the downward movement of the head 195 of the latch arm is determined by the stop member 200 mounted on the chassis 146. The position of the friction ring 182 relative to the base 175 of the contact breaker arm 174 may be adjusted by the screw 201 mounted on the arm 188 which bears against the outer end of the slide actuating rod 185.

Figure 27:
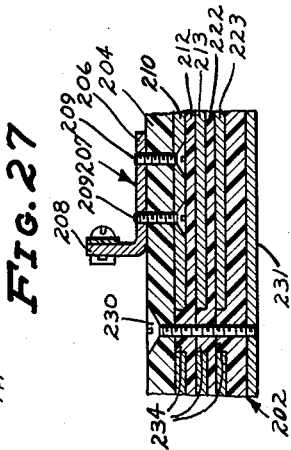
FIGURE 27 is a sectional view on the line 27—27 of FIGURE 25.
Figure 26:
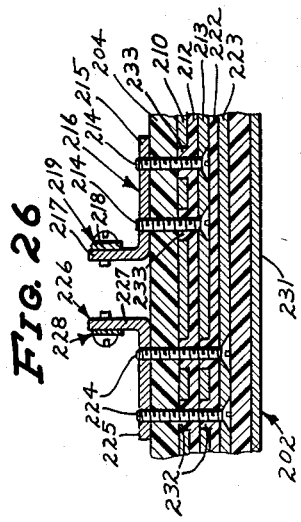
FIGURE 26 is a sectional view on the line 26—26 of FIGURE 25.
Figure 7:
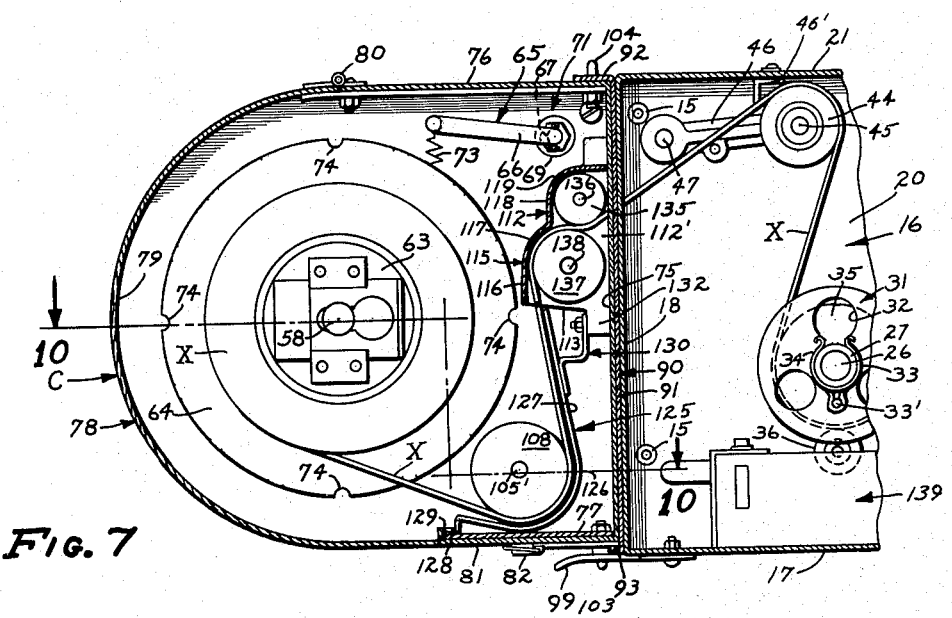
FIGURE 7 is a front side view of the paper supply roll magazine in closed position and a portion of the casing, some parts in section and some parts removed.

The numeral 202 designates a contact disc assembly support including a series of electrical contact discs and insulators hereinafter described, and the assembly includes the hub portion 203 and the flange portion 204. The hub portion 203 is rotatably mounted on the end of the shaft 26 by means of the bearing 205 thereby making the disc assembly 202 rotatable. Secured to the inner surface of the flange 204 is the base portion 206 of the bracket 207 which includes the right angular upstanding leg 208, FIGURES 20 and 27. The base portion 206 of the bracket 207 is secured by means of the screws 209 extending from the brass contact disc 210, through the flange 204 and threadedly engaging the bracket 207. The leg portion 208 supports the fixed contact 211, FIGURES 20, 25 and 27. The numeral 212 indicates a disclike insulator positioned against the contact disc 210 both of which have a snug fit on the hub 203. A further brass contact disc 213 is also mounted on the hub 203 against the insulator 212 and securing the disc 213 against the disc 212 are the screws 214 which extend through the discs 212, 210 and the flange 204 where the same threadedly engages the leg portion 215 of the bracket 216. The bracket 216 also includes the upright leg portion 217 which mounts the base end 218 of the flexible contact arm 219. A contact 220 is mounted adjacent the outer end of the flexible arm 219 for engagement with the fixed contact 211. Secured to the outer end of the arm 219 is the insulating contact lifter 221.

Positioned on the hub 203 and adjacent the contact disc 213 is the insulator disc 222 and adjacent the disc 222 is the outermost contact disc 223 which is secured by means of the screws 224 extending through the discs 222, 213, 212 and 210 and the supporting flange 204, where the screws threadedly engage the base portion 225 of the bracket 226. The upright leg portion 227 of the bracket 226 mounts the contact arm 228 not used in the present cycle.

Also provided is the outermost insulator disc 229 positioned on the hub 203 adjacent the contact disc 223 and which is secured in position by the three screws 230 threaded into the gear member 231 mounted outwardly of the disc 229 and extending through the various discs from the flange 204.

Electrical conductivity is made from the contact disc 223 to the bracket 226 by means of the screws 224 extending through the bosses 232 formed in the insulator discs 212 and 222. Conductivity is made from the contact disc 213 to the bracket 216 by means of the screws 214 extending through the bosses 233 formed in the insulator disc 212. Conductivity is made between the contact disc 210 and the bracket 207 by means of the screws 209. The bosses 234 of the insulator discs 212, 222 and 229 insulate the screws 230 from the contact discs 210, 213 and 223.

Further provided is the terminal block 235, FIGURE 20, mounted on the support portion 166 of the chassis 146' and secured to the block 235 is the base end 236 of the spring conductor arm 237. The base end 236 terminates in the outer arm portion 238 which bears against the conductor disc 213. A second spring conductor arm 239 is formed with the base end 240 secured to the terminal block 235 adjacent the base end 236 of the spring arm 237. The base end 240 of the second arm 239 terminates in the outer arm portion 241 which bears against the conductor disc 210.

I further provide means for changing the distance between the shoulder 178 of the contact breaker arm 174 and the contact lifter 221, FIGURE 25. The distance between the shoulder 178 and the contact lifter 221 determines the amount of rotation of the shaft 26 as will be hereinafter explained. The means for changing the distance between the above shoulder 178 and the lifter 221 includes the index gear member 242 rotatably mounted on the wall support 166 by means of the pin 243 whereby the teeth of the gear 242 engage with the teeth of the gear 231 connected to the contact disc assembly 202 as hereinbefore set forth.

It will be seen that as the index gear 242 is rotated in a counter clockwise direction, as viewed from the rear of the machine the gear member 231 is rotated in a clockwise direction thereby rotating the contact disc assembly 202 in a clockwise direction thereby moving the pair of normally closed contacts 211 and 220 and contact lifter 221 associated therewith away from the shoulder 178 of the contact breaker arm. As a result the amount of travel of the shoulder 178 is increased. The distance between the shoulder 178 and contact lifter 221 may be decreased by reversing the rotation of the index gear 242. The index gear 242 may be locked in position by means of the bar 244 pivotally mounted on the pin 245 secured to the support 166. The bar 244 is urged downwardly for engagement with the teeth of the gear 242 by means of the spring 246.

The sprocket 160 is continually rotated by means hereinafter described when the machine is used, and the plate portion 161 is urged against the felt washer 162 which in turn is urged against the ratchet 163 secured to the shaft 26 as hereinbefore described thereby providing a friction slip clutch, the ratchet 163 restrained from rotation by the head portion 195 of the latch arm 188 in down position in engagement with a tooth of the ratchet 163. It is to be noted that when the head 195 is in engagement with the ratchet 163 that the arm 188 through the rod 185 maintains the friction ring 182 disengaged from the base portion 173 of the arm 174, the exact position of the ring 182 determined by the adjusting screw 201.

To operate the drive assembly B, the solenoid generally indicated by numeral 196' is energized by a pulse to a relay hold-in circuit hereinafter referred to. The electrical source of power is transmitted through conductor arm 238, contact disc 213, contact 220, 211, contact disc 210 and through conductor arm 241, the contacts 220 and 211 thereby being in series with the parallel combination of the hold-in relay (not shown) and solenoid 196'. The armature bar 196 is drawn inwardly thereby pivoting the latch arm 188 and as a result the rod 185 moves outwardly of the shaft 26 by means of the spring 187 thereby causing the ring 182 to engage the base portion 175 of the arm 174 in effect connecting by friction means the arm 174 to the shaft 26. Further pivoting of the arm 188 withdraws the head 195 thereof from the ratchet 163, and as a result the shaft 26 is rotated through the driving action of the driven sprocket 160 and the friction slip connection afforded by the flange 161, the flat washer 162 and the inner face of the sprocket 163 as hereinbefore described. With the rotation of the shaft 26 the paper feed roller 35 mounted thereon is rotated as hereinbefore and hereinafter described.

As the shaft 26 is rotated, as set out above, the arm 174 is caused to rotate and continues to rotate until the shoulder 178 thereof engages the contact lifter 221 and further rotation separates contacts 220 and 211 thereby de-energizing the solenoid 196' and hold-in relay above referred to. As a result the spring 198 is free to and does draw the leg portion 194 of the arm 188 downwardly thereby engaging the head portion 195 with a tooth of the ratchet 163 and stopping the rotation of the shaft 26. Further pivoting movement of the arm 188 moves the rod 185 inwardly through the screw member 201 and disengages the friction ring 182 from the base portion 175 of the arm 174. The arm 174 then rotatively returns due to the action of the spring 170 to its original position as determined by the stop 172.

It is to be noted that a greater or lesser rotation of the shaft 26 may be effected to thereby feed a greater or lesser length of strip material X through the rotation of the feed roller 35 by varying the position of the contact disc assembly 202 to which the fixed contacts 220 and 211 are connected. Electrical conductivity is maintained through the arm 238, disc 213 and contact 220, 211, contact disc 210 including conductor spring arm 241, FIGURES 20, 25, 26 and 27.

Referring back to the positioning of the strip print paper under the feed roller 35 for advancement thereby to the table member 139, the print paper is held in alignment and proper position for exposure by means of the secondary table or paper mask and support 250 formed with the aperture 251 in the top 252 thereof and over which the paper is positioned. A plate 253 is positioned upon the paper upon the paper support 250 and maintained in position by the stops 254. An alarm device designated generally as 255 is mounted on the arm 256 overlying the path of the print paper, the arm 256 being pivotally mounted on the rod member 257 connected to the plate 258 which is secured to the rear casing wall 20. The arm 259 of the alarm 255 is responsive to a splice hole formed in the paper and through electrical circuit means not shown, the audible signal is given so that the operator will not print in the spliced area.

The print paper moves from the paper support 250 to and under a pair of rollers 260 and 261 mounted on the carriage 262 which is slidably and adjustably positioned on the table member 139. The carriage 262 mounts a paper slitting device and a paper numbering device.

The print paper strip is passed upwardly from the rollers 260 and 261 and over a cushion or take-up roller 263 freely rotatable on the shaft 264 secured to the end 265 of the arm 266. The opposite end 267 of the arm 266 is pivotally connected to the rear casing wall 20 and the arm is urged upwardly by means of the coil spring 268 secured to the arm 266 and the support 269. The upward movement of the arm 266 is limited by the stop 270 secured to the rear wall 20 and the downward movement is limited by the stop 271 also secured to the rear wall 20. Secured to the inner surface of the end wall 19 is the light lock housing 112" identical to that mounted in the magazine C but in reversed position, FIGURE 2. The numeral 272, FIGURE 30, designates a magazine receiver plate secured to the casing end wall 19 and which is substantially the same as the receiver plate 90 hereinbefore described and which receives the magazine D which is the same construction as magazine C and may be used interchangeably therewith.

The receiver plate 272 includes the flat base portion 273, the peripheral upper, lower and side walls 274, 275 and 276 respectively. The plate portion is formed with the paper receiving aperture 277 which is in alignment with a similar aperture formed in the end wall 19. The upper wall 274 of the magazine receiver plate 272 is formed with the pair of spaced holes 278 which receive the pins 102 and 103, FIGURES 13 and 2, of the magazine D which is identical to magazine C only in reversed top to bottom position. In other words, where the pins 102 and 103 of the magazine C are in a lower position and engage the spring tongues 98 and 99 as in FIGURE 2 and FIGURE 12, in the case of magazine D the pins 102 and 103 thereof are in an upward position and engage the pair of holes 278 in the upper wall 274 of the magazine receiver plate 272 as will be seen in FIGURES 2 and 30. Further, in the case of the magazine D, the pins 104 are in a lower position and engage the holes 279 and 280 of the spring tongues 281 and 282 respectively to thereby mount the magazine D on the casing 16 in substantially the manner in which the magazine C is mounted on the casing 16 as hereinbefore described.

As pointed out the magazine D is a duplicate of magazine C and includes the light lock housing 112''' which is identical with the housing 112 including the upper roller 135 and the lower roller 137 between which the paper X is positioned. The paper X is further fed upwardly and around the guide rollers 107 and 108 to the spool 63, which in the case of the magazine D is the take-up spool.

When the magazine D is secured to the end of the casing as set out above, the pulley 57 automatically engages the belt 283 which is mounted on the idler pulley 284 on the lower shaft 285 journaled in the boss 286 formed on the support wall 10 and the driven pulley 287 mounted on the upper shaft 288 journaled in the boss 289 formed on the support wall 10 directly above the boss 286. Mounted on the outer or rear end of the shaft 288 is the slip clutch unit 290 including the pulley 291 on which the belt 292 is positioned. The belt 292 is also positioned around the pulley 293, FIGURE 3, which has secured thereto the drive gear 294 mounted on the shaft 295 of the gear reduction unit 296 driven by the motor 297. The motor 297 is mounted on the support frame 298 secured to the wall support 10 by means of the bolts 299 and operated by a conventional switch and a source of electrical power not shown.

Positioned on the drive gear 294 is the chain 300 which is also positioned on the take-up idler gear 301 mounted on the arm 302 adjustably mounted on the support wall 10. The chain 300 is also positioned on the sprocket 160 on the drive assembly B hereinbefore described, the chain passing downwardly through the opening 303 formed in the upper wall 145 of the housing 144.

Figure 2:
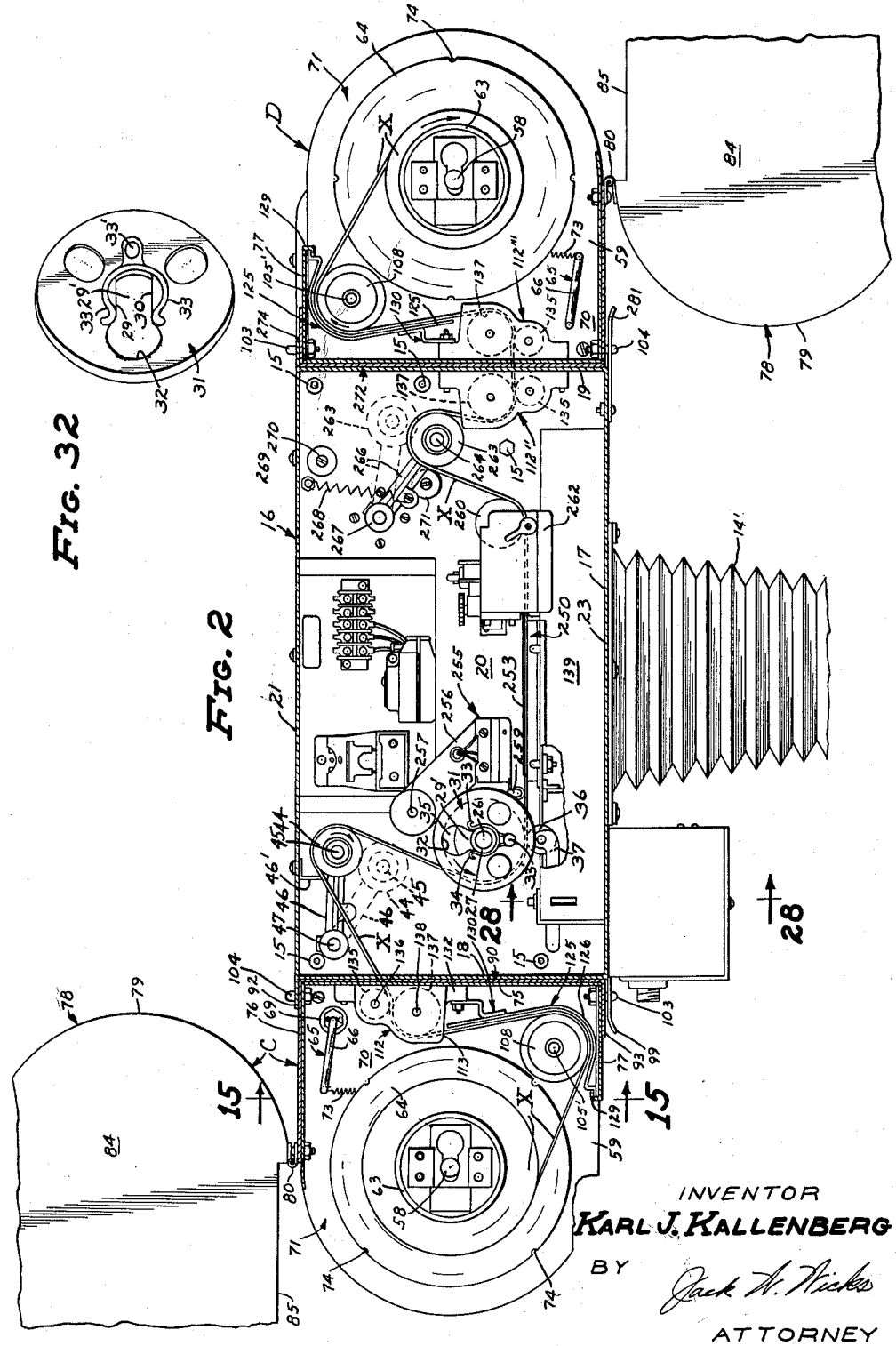
FIGURE 2 is a front elevational view of the upper deck casing with the cover door removed and the paper roll magazines in open positions.
Figure 3:
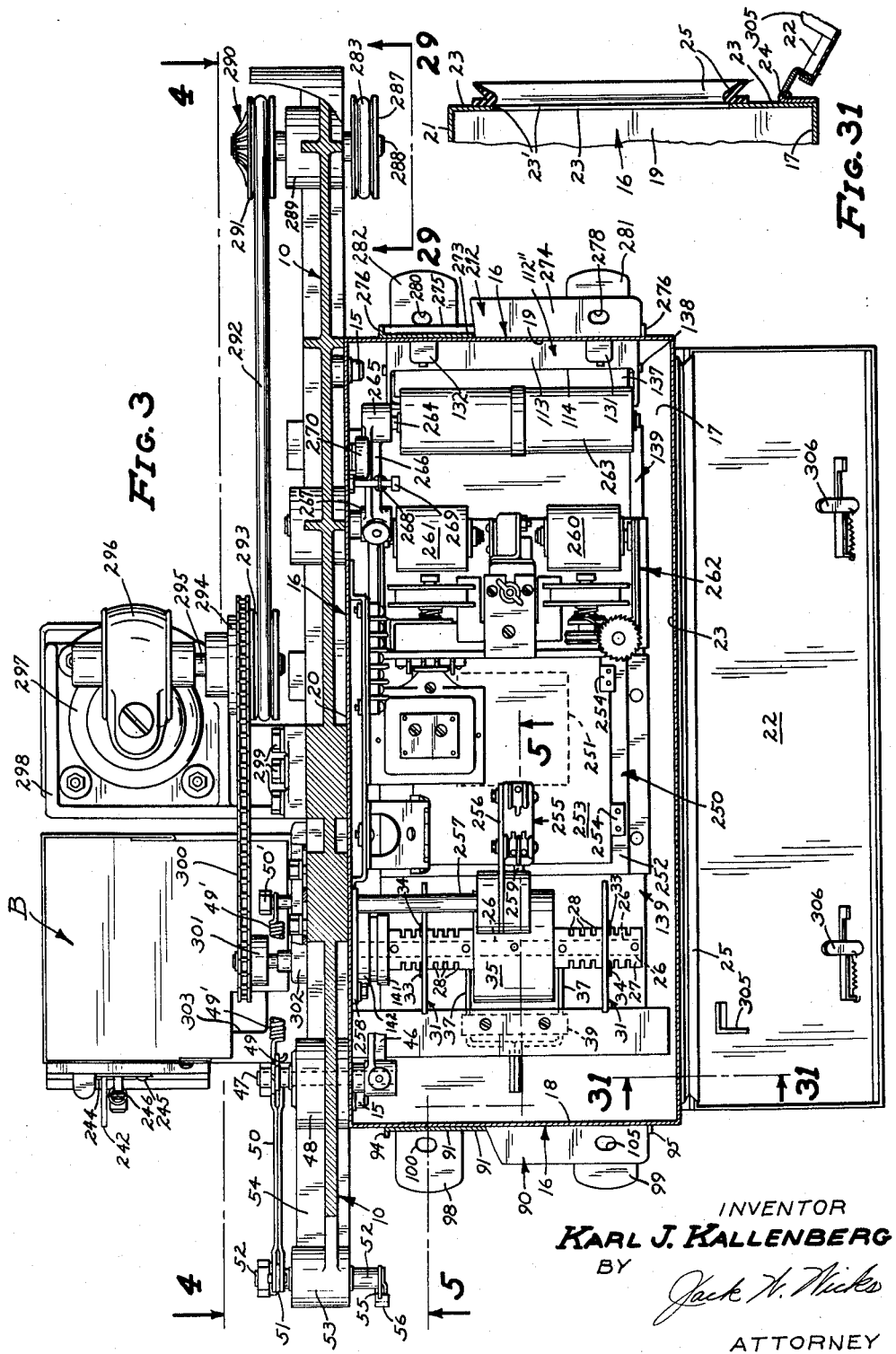
FIGURE 3 is a top plan view of the upper deck unit some parts in section, other parts removed and the cover door for the casing in lowered open position.

With regard to the operation of my device and looking particularly at FIGURE 2 wherein the print paper X is threaded in operative position, the paper X receives an exposure from a light source from electrical timing means located beneath the base 13 which passes through a negative positioned on the frame 13', the objective lens positioned within the lens deck housing 14 secured to the lower end of the bellows 14' and thence to the aperture 251.

After the termination of the above exposure, the paper feed roller 35 is rotated by means of the drive assembly hereinbefore described through electrical timing means. As the roller 35 is rotated in a counterclockwise direction the paper X is advanced between said roller and the pressure roller 36 to the paper mask and 252, and as the roller 35 rotates, the paper draw-up roller 44 is pulled downwardly about the pin 47 substantially to the broken line position of FIGURE 2 against the action of the spring 49'. The rotation of the pin 47 removes the brake shoe 56 from the edge of the pulley 57 of the magazine C through the linkage hereinbefore described thereby allowing the paper supply spool 63 to be rotated. When the feed roller 35 is stopped, the draw-up roller 44 is drawn upwardly by the spring 49' and in so doing draws a length of paper X off the spool 63. As the roller 44 assumes its substantially upward position, FIGURES 2 and 5, the brake shoe 56 engages the pulley 57 thereby braking the spool 63. The length of paper is drawn off, as above, so that when the feed roller 35 is again rotated to advance the paper X, the mass of the roll of paper and the spool does not have to be overcome, but rather the feeding of paper by the roller is directly from the length of paper which was drawn off the spool by the return of the draw-up roller 44.

With further regard to the action of the machine, the paper X extends under the pair of rollers 260 and 261 and upwardly to and over the take-up roller 263, then downwardly into the light lock housing 112'' where the paper is passed between the rollers 135 and 137 thereof. The paper further extends through the apertures formed in the casing end wall 19 and the end of the magazine D, thence between the rollers 135 and 137 of the light lock housing 112''' from which the paper is passed over the paper guide rollers 107 and 108 in the magazine D and upon the take-up spool 63 therein.

When the magazine D is in the position of FIGURE 2 the pulley 57 thereof is urged to rotate due to the fact that it engages the belt 283 driven by the slip clutch 290 through the pulley 287 both of which are mounted on the shaft 288, FIGURES 3, 4, 17 and 29. It is to be noted that the driving force of the slip clutch 290 creates a pull on the paper X and as a result the take-up roller 263 is pulled into the downward position of FIGURE 2.

As the paper is advanced from the drive roller 35, the roller 263 begins to draw the paper upwardly because the mass to overcome of the roller 263 is less than the turning movement urged on the take-up spool 63 by the slip clutch 290. As the paper is begun to be drawn upwardly by the cushion or take-up roller 263, the spool 63 begins to rotate to wind paper on the same. As the advance of the paper is stopped by the roller 35, the take-up spool 63 continues to rotate and wind paper thereon, and as this winding occurs the roller 263 is drawn downwardly by the pull of the paper X against the action of the spring 268, thereby providing a cushion for the paper take-up on the take-up spool 63 with the resultant effect that there is substantially no chance for movement of paper at the paper support mask 250. Further, an additional benefit of the action of the cushion roller 263 is to keep the paper under slight tension and aid in correct tracking through the mechanism.

The electrical power to the casing 16 is provided through the interlock switch 304 mounted on the inside of the casing, the points of which are held in closed position by means of the lug 305 mounted on the inside of the door 22 when the door is in closed light-sealing position, FIGURE 28. The switch contacts are opened when the door 22 is opened thereby cutting off power to the casing as a safety factor. The cover is maintained in closed position by means of the lock members 306 which engage a portion of the casing.

It is to be noted that when both of the magazines C and D are attached to the casing 16, the entire unit is light proof, and when the take-up spool 63 is full with exposed paper, the magazine D may be removed from the casing for further processing, for the magazine is impervious to light. This is particularly desirable when color prints are made for light must be excluded. With the magazine D removed light cannot enter the casing 16.

As can be seen from FIGURE 20, the timer 307 utilized for determining the exposure period can be employed for providing a pulse to energize the solenoid which is held in by the hold-in relay 308 at the end of the exposure period.

The invention is not to be understood as restricted to the details set forth since these may be modified within the scope of the appended claims without departing from the spirit and scope of the invention.

Having thus described the invention, what I claim as new and desire to secure by Letters Patent is:

1. A photographic printer machine comprising, in combination, a casing formed with light excluding means, a first magazine having light excluding means and a print paper supply spool mounted therein, means for detachably securing said first magazine to said casing, a second magazine having light excluding means and a paper take-up spool mounted therein, means for detachably securing said second magazine to said casing, aperture means connecting the interiors of said magazines with the interior of said casing, means in said casing for feeding a strip of print paper from said paper supply spool to an exposure aperture in said casing and thence to said take-up spool through said aperture means, means for intermittently actuating said paper-feeding means, single means in said casing responsive to the action of said paper-feeding means through the print paper for advancing a length of paper off said paper supply spool at a point between said supply spool and said paper-feeding means, said length of paper advanced being first drawn by said paper-feeding means, said paper advancing single means comprising an arm having the inner end thereof pivotally connected to said casing, a roller member rotatably connected to the outer end of said arm, said roller positioned transversely of the strip print paper and over which the print paper is positioned and from which the paper goes directly to the paper-feeding means, and shoe means connected to said arm adapted to brake said paper spool of said first magazine when said roller is not responsively actuated by said paper-feeding means.

2. The device of claim 1 further characterized by second single means for producing a length of print paper at a point between the exposure aperture and the take-up spool which length of print paper is initially drawn upon by the action of the paper take-up spool whereby take-up of the print paper is not directly from the exposure aperture.

References Cited in the file of this patent

UNITED STATES PATENTS

| | | |
|---|---|---|
| 1,375,923 | Lysle | Apr. 26, 1921 |
| 1,914,214 | Porter | June 13, 1933 |
| 1,944,039 | Sweet | Jan. 16, 1934 |
| 2,055,113 | Tondreau | Sept. 22, 1936 |
| 2,206,381 | Zimmerman | July 2, 1940 |
| 2,209,178 | Taesler | July 23, 1940 |
| 2,224,001 | Newton et al. | Dec. 3, 1940 |
| 2,275,497 | Berndt | Mar. 10, 1942 |
| 2,275,498 | Berndt | Mar. 10, 1942 |
| 2,403,587 | Doyle et al. | July 9, 1946 |
| 2,578,283 | Bornemann et al. | Dec. 11, 1951 |
| 2,673,500 | Cassidy et al. | Mar. 30, 1954 |
| 2,762,255 | Anderson | Sept. 11, 1956 |
| 2,788,703 | Holman | Apr. 16, 1957 |

FOREIGN PATENTS

| | | |
|---|---|---|
| 770,634 | Great Britain | Mar. 20, 1957 |